US012253732B2

(12) United States Patent
Lutterkordt et al.

(10) Patent No.: US 12,253,732 B2
(45) Date of Patent: Mar. 18, 2025

(54) FIBER OPTIC ASSEMBLY WITH SPLICE TRAY

(71) Applicant: CORNING RESEARCH & DEVELOPMENT CORPORATION, Corning, NY (US)

(72) Inventors: Ulrich Lutterkordt, Wuppertal (DE); Andreas Zappek, Dinslaken (DE)

(73) Assignee: Corning Research & Development Corporation, Corning, NY (US)

( * ) Notice: Subject to any disclaimer, the term of this patent is extended or adjusted under 35 U.S.C. 154(b) by 181 days.

(21) Appl. No.: 17/839,544

(22) Filed: Jun. 14, 2022

(65) Prior Publication Data

US 2022/0413244 A1 Dec. 29, 2022

Related U.S. Application Data

(60) Provisional application No. 63/213,980, filed on Jun. 23, 2021.

(51) Int. Cl.
G02B 6/44 (2006.01)
(52) U.S. Cl.
CPC ......... *G02B 6/4455* (2013.01); *G02B 6/4454* (2013.01); *G02B 6/44465* (2023.05); *G02B 6/445* (2013.01); *G02B 6/44528* (2023.05)
(58) Field of Classification Search
CPC .... G02B 6/4454; G02B 6/445; G02B 6/4455; G02B 6/4452; G02B 6/4457; G02B 6/4442; G02B 6/4444; G02B 6/4446; G02B 6/4453; G02B 6/4441; G02B 6/4445; G02B 6/44465; G02B 6/4447

USPC .................................................. 385/134–137
See application file for complete search history.

(56) References Cited

U.S. PATENT DOCUMENTS

| 6,496,640 | B1 | 12/2002 | Harvey et al. |
| 7,822,310 | B2 | 10/2010 | Castonguay et al. |
| 8,798,427 | B2* | 8/2014 | Cox ..................... G02B 6/4471 385/134 |
| 10,578,823 | B2 | 3/2020 | Raven et al. |
| 11,009,670 | B2 | 5/2021 | Kowalczyk et al. |
| 11,036,018 | B2* | 6/2021 | Holmberg ............ G02B 6/3897 |
| 11,686,905 | B2* | 6/2023 | Geens .................. G02B 6/4453 385/135 |
| 12,050,354 | B2* | 7/2024 | Vieira .................. G02B 6/4471 |
| 2011/0268414 | A1 | 11/2011 | Giraud et al. |

(Continued)

FOREIGN PATENT DOCUMENTS

WO 2013/131788 A2 9/2013

OTHER PUBLICATIONS

European Patent Application No. 22179485.2 Search Report and Search Opinion dated Oct. 24, 2022; 9 Pages; European Patent Office.

*Primary Examiner* — Michelle R Connelly

(57) ABSTRACT

The present disclosure relates to a fiber optic assembly having a splice tray that increases spatial efficiency within the fiber optic assembly and within the splice tray. The splice tray may be inserted and/or removed from a terminal without utilization of tools. Additionally, the splice tray may be configured to enable one handed insertion or removal, which may be advantageous, such as in small terminals or confined spaces. The splice tray also provides an efficient routing pattern of optical fibers to enable larger diameter optical fibers to be routed within the splice tray and the terminal.

19 Claims, 18 Drawing Sheets

(56) References Cited

U.S. PATENT DOCUMENTS

| | | | |
|---|---|---|---|
| 2018/0292622 A1* | 10/2018 | Clatanoff | G02B 6/445 |
| 2019/0064463 A1 | 2/2019 | Bandy et al. | |
| 2019/0204523 A1* | 7/2019 | Bishop | G02B 6/44465 |
| 2020/0233172 A1 | 7/2020 | Prevratil et al. | |
| 2023/0090507 A1* | 3/2023 | Claessens | G02B 6/4455 |
| | | | 385/135 |
| 2024/0036281 A1* | 2/2024 | Moreira | G02B 6/4454 |

* cited by examiner

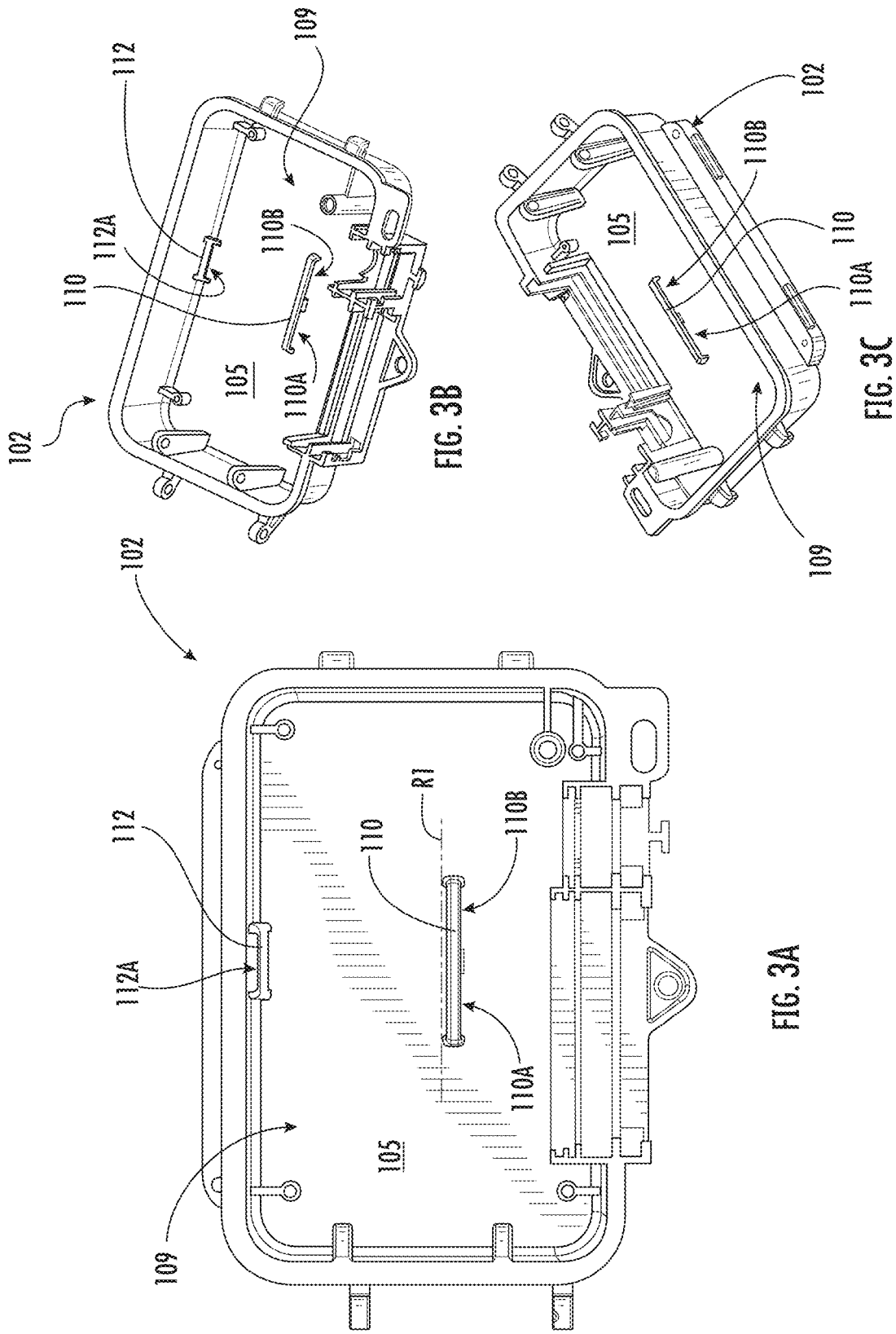

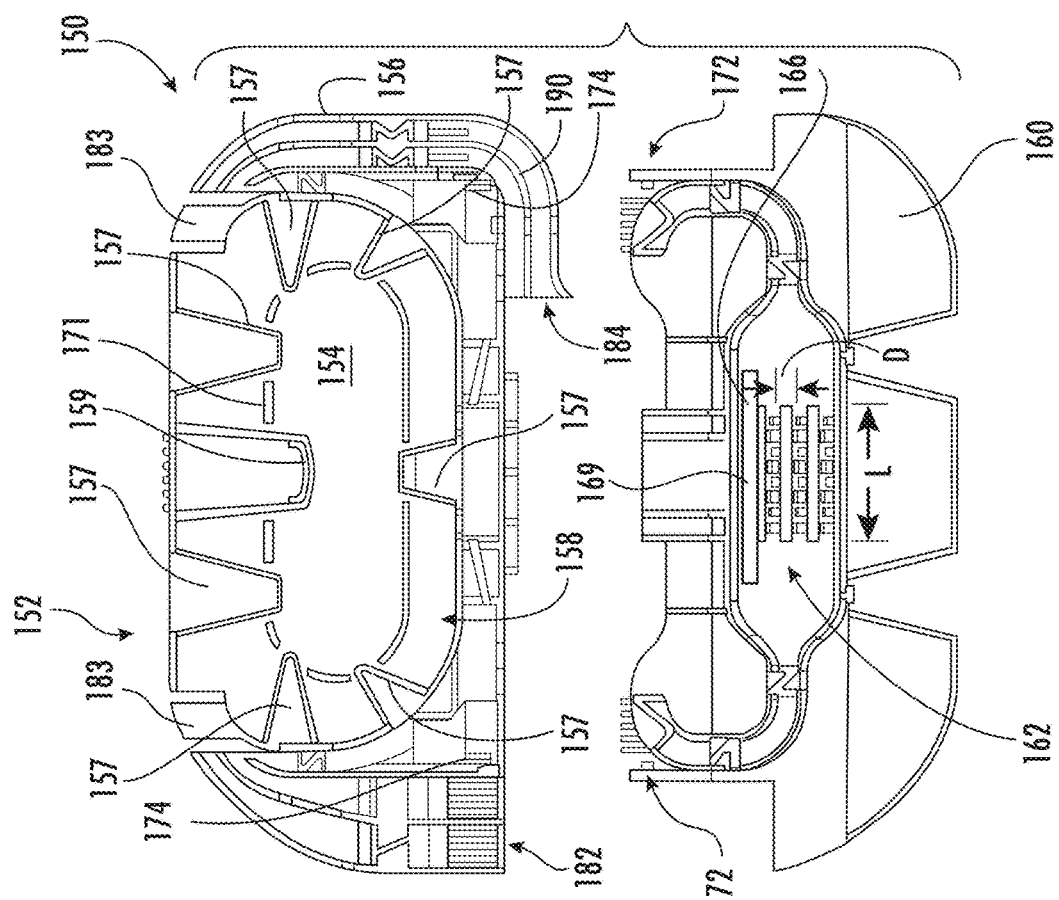
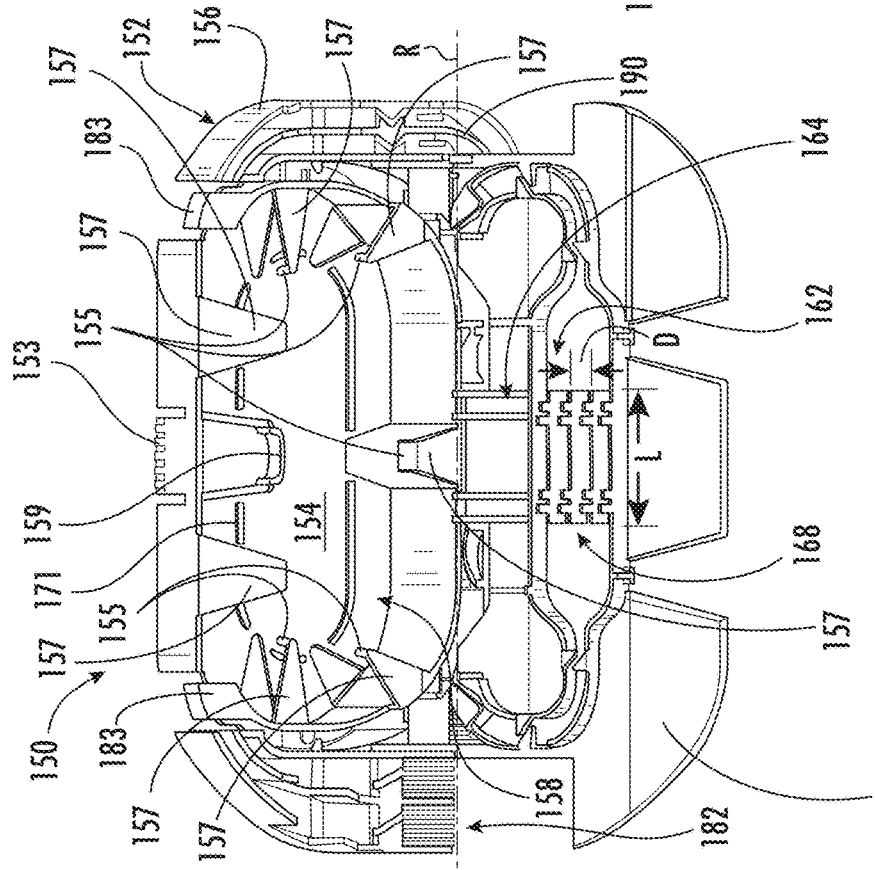

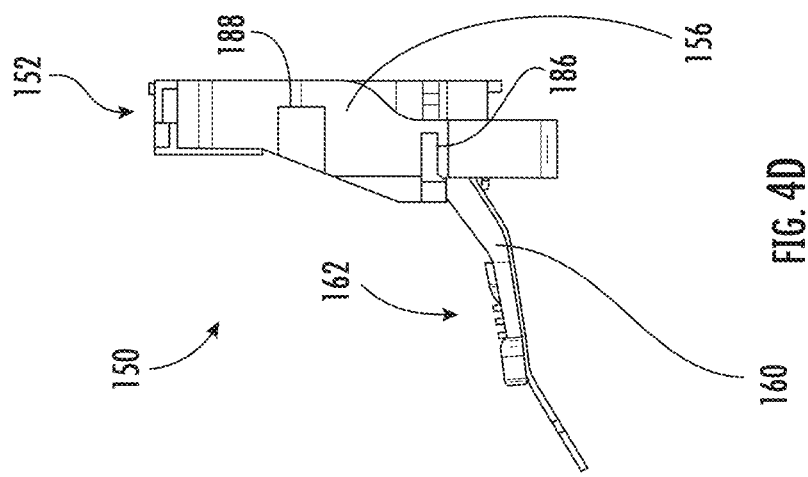
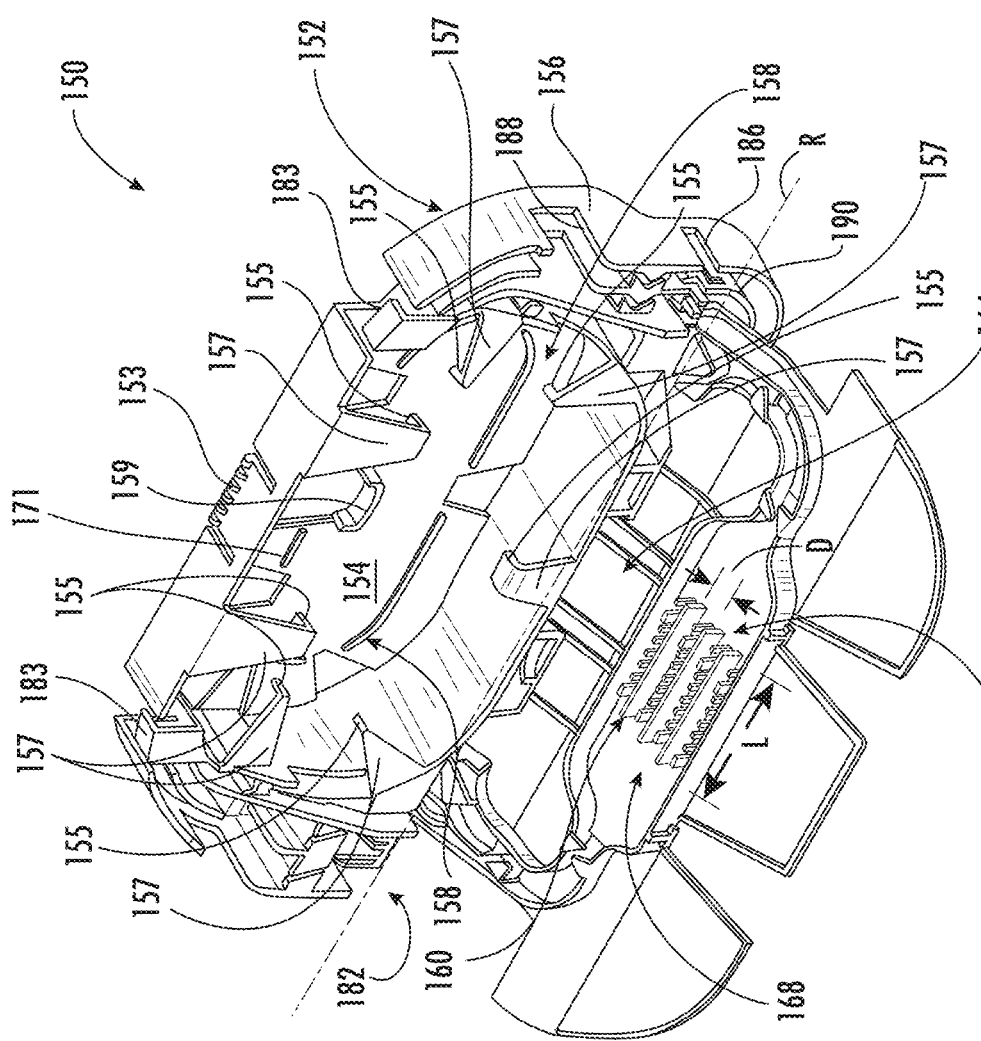

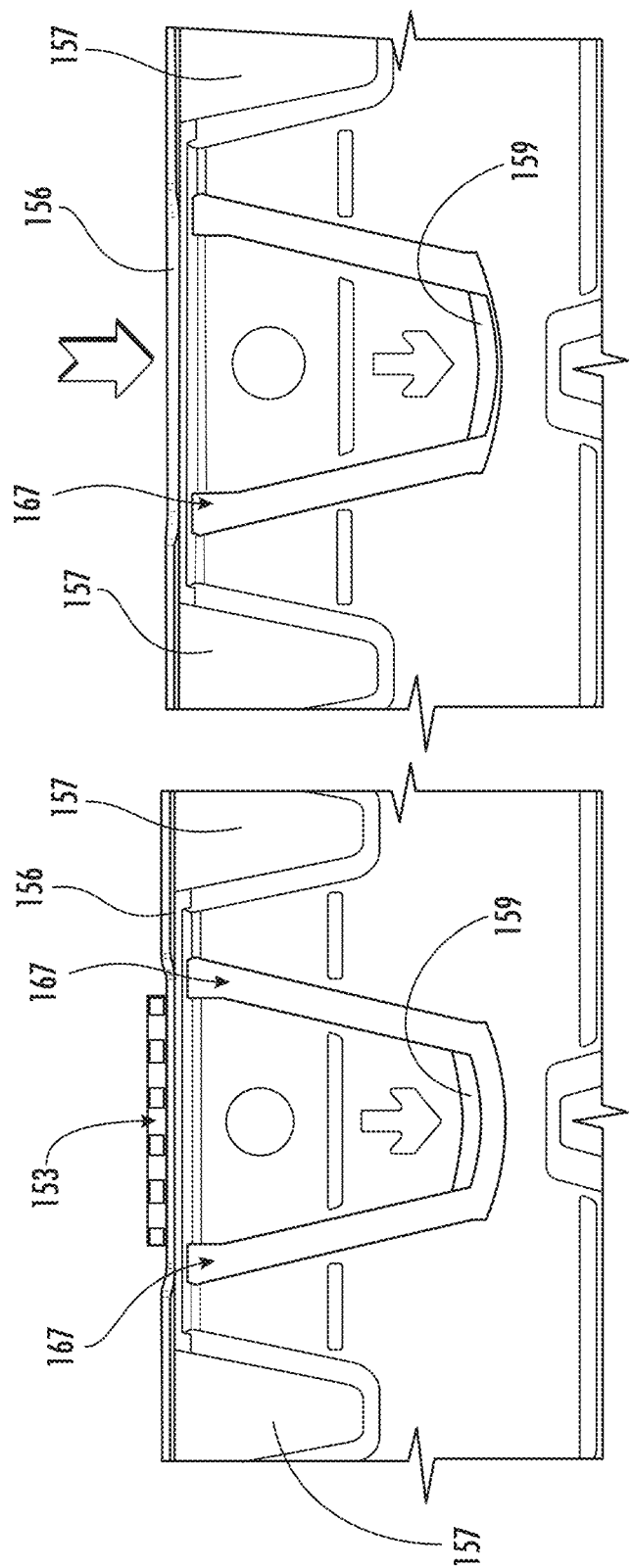

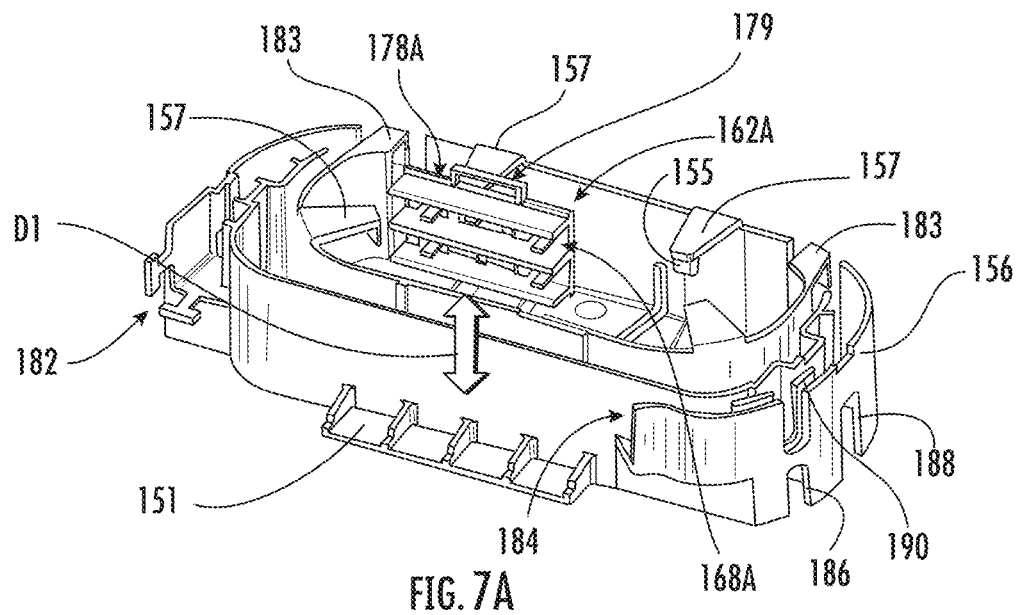
FIG. 7A
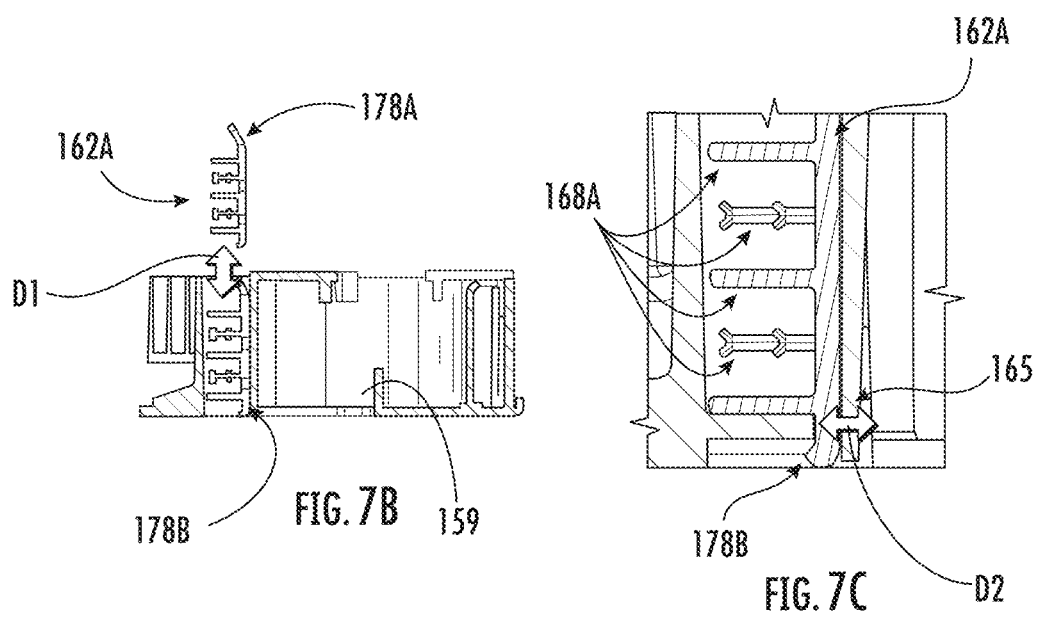
FIG. 7B
FIG. 7C

FIBER OPTIC ASSEMBLY WITH SPLICE TRAY

PRIORITY APPLICATION

This application claims the benefit of priority of U.S. Provisional Application No. 63/213,980, filed on Jun. 23, 2021, the content of which is relied upon and incorporated herein by reference in its entirety.

FIELD

This disclosure generally pertains to fiber optic assemblies, and more particularly to a fiber optic assembly including a splice tray within a fiber optic terminal.

BACKGROUND

In fiber optic networks, fiber optic cables may be connected to various fiber optic assemblies (e.g., hardware, housings, enclosures, etc.). Fiber optic assemblies may include multiple dwelling units (MDUs) configured to transition the optical carrier from a feeder cable including multiple optical signals on one or more optical fibers to one or more subscriber cables. The MDUs may house one or more splice connections to a feeder cable, a plurality of patch connections, one or more splitters, a plurality of slice connections to subscriber cables, or the like. The number or types of cables, signal paths, and connection types may cause installation and/or repair to be complex and ins some cases time intensive.

SUMMARY

The present disclosure relates to a fiber optic assembly having a splice tray that increases spatial efficiency within the fiber optic assembly and within the splice tray. The splice tray may be inserted and/or removed from a terminal without utilization of tools. Additionally, the splice tray may be configured to enable one handed insertion or removal, which may be advantageous, such as in small terminals or confined spaces. The splice tray also provides an efficient routing pattern of optical fibers to enable larger diameter optical fibers to be routed within the splice tray and the terminal.

In one embodiment, a splice tray is provided. The splice tray comprising: a base having a rear surface and at least one edge surface surrounding at least a portion of a perimeter of the base, the base and the at least one edge surface defining a recess therein; a splice cover removably coupled to the edge surfaces of the base, wherein the cover is configured to at least partially enclose the recess, wherein the splice cover includes at least one splice holder received in the recess of the base when the splice cover covers the recess; an inner latch extending from the edge surface and configured to engage a first fix point of a base of a terminal; an outer latch extending from the edge surface and disposed opposite to the inner latch; wherein the outer latch is configured to engage a second fix point disposed in the base of the terminal; and a handle coupled to the outer latch such that when the handle is actuated, the outer latch disengages from the second fix point and the splice tray is decoupled from the base.

In another embodiment, when the splice cover covers the recess, the splice tray includes a storage area configured to route optical fibers circumferentially around the at least one splice holder. In another embodiment, the splice cover further comprises a parking area adjacent to the at least one splice holder. In another embodiment, the splice cover includes an aperture to enable a finger lever release to open the cover of the splice tray. In another embodiment, the handle is positioned on the rear surface of the base and the handle includes at least one aperture. In another embodiment, the at least one aperture receives optical fibers routed within the splice tray and the terminal. In another embodiment, the splice tray can route optical fibers having an outer diameter of up to 900 μm.

In one embodiment, a splice tray is provided. The splice tray comprising: a base having a rear surface and at least one edge surface surrounding at least a portion of a perimeter of the base, the base and the at least one edge surface defining a recess therein; an inner latch extending from the edge surface and configured to engage a first fix point of a base of a terminal; an outer latch extending from the edge surface and disposed opposite to the inner latch; wherein the outer latch is configured to engage a second fix point disposed in the base of the terminal; and a handle coupled to the outer latch such that when the handle is actuated, the outer latch disengages from the second fix point and the splice tray is decoupled from the base.

In another embodiment, the splice tray further comprising at least one splice holder coupled to the at least one edge surface, the at least one splice holder having at least one slot, wherein the at least one slot has a longitudinal axis parallel to the at least one edge surface. In another embodiment, the at least one splice holder is coupled to the at least one edge surface by snap fit, wherein a protrusion of the at least one edge surface engages with a coupling channel having an aperture, wherein the protrusion is inserted into the aperture of the coupling channel. In another embodiment, the handle is positioned on the rear surface of the base. In another embodiment, the splice tray can route optical fibers having an outer diameter of up to 900 μm.

In one embodiment, a fiber optic assembly is provided. The fiber optic assembly comprising: a terminal comprising: a base having a rear surface and at least one edge surface surrounding at least a portion of a perimeter of the base, the base and the at least one edge surface defining a recess therein; an inner latch extending from the edge surface and configured to engage a first fix point of a base of a terminal; an outer latch extending from the edge surface and disposed opposite to the inner latch; wherein the outer latch is configured to engage a second fix point disposed in the base of the terminal; and a handle coupled to the outer latch such that when the handle is actuated, the outer latch disengages from the second fix point and the splice tray is decoupled from the base; a cover configured to engage the sidewall to enclose a portion of the fiber optic assembly; a midplane separating the base and the cover.

In another embodiment, the fiber optic assembly further comprising a splice cover removably coupled to the edge surfaces of the base, wherein the cover is configured to at least partially enclose the recess. In another embodiment, when the splice cover covers the recess, the splice tray includes a storage area configured to route optical fibers circumferentially around the at least one splice holder. In another embodiment, the splice cover further comprises a parking area adjacent to the at least one splice holder. In another embodiment, the splice cover includes an aperture to enable a finger lever release to open the splice cover of the splice tray. In another embodiment, the handle is positioned on the rear surface of the base. In another embodiment, the splice tray can route optical fibers having an outer diameter of up to 900 μm.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

FIGS. 3A-3C are top and perspective views of the base of the example fiber optic assembly of FIG. 2 with internal components removed according to an example embodiment;

FIG. 4A is a top perspective view of a splice tray according to an example embodiment;

FIG. 4B is a top view of the splice tray of FIG. 4A as disassembled according to an example embodiment;

FIG. 4C is a perspective view of the splice tray of FIG. 4A according to an example embodiment;

FIG. 4D is a side view of the splice tray of FIG. 4A according to an example embodiment;

FIGS. 4I-4J are expanded views of a handle of the splice tray of FIG. 4A according to an example embodiment;

FIGS. 7A-7C illustrate a method of installing an alternate splice holder into an alternate splice tray according to an example embodiment;

Figure 1:
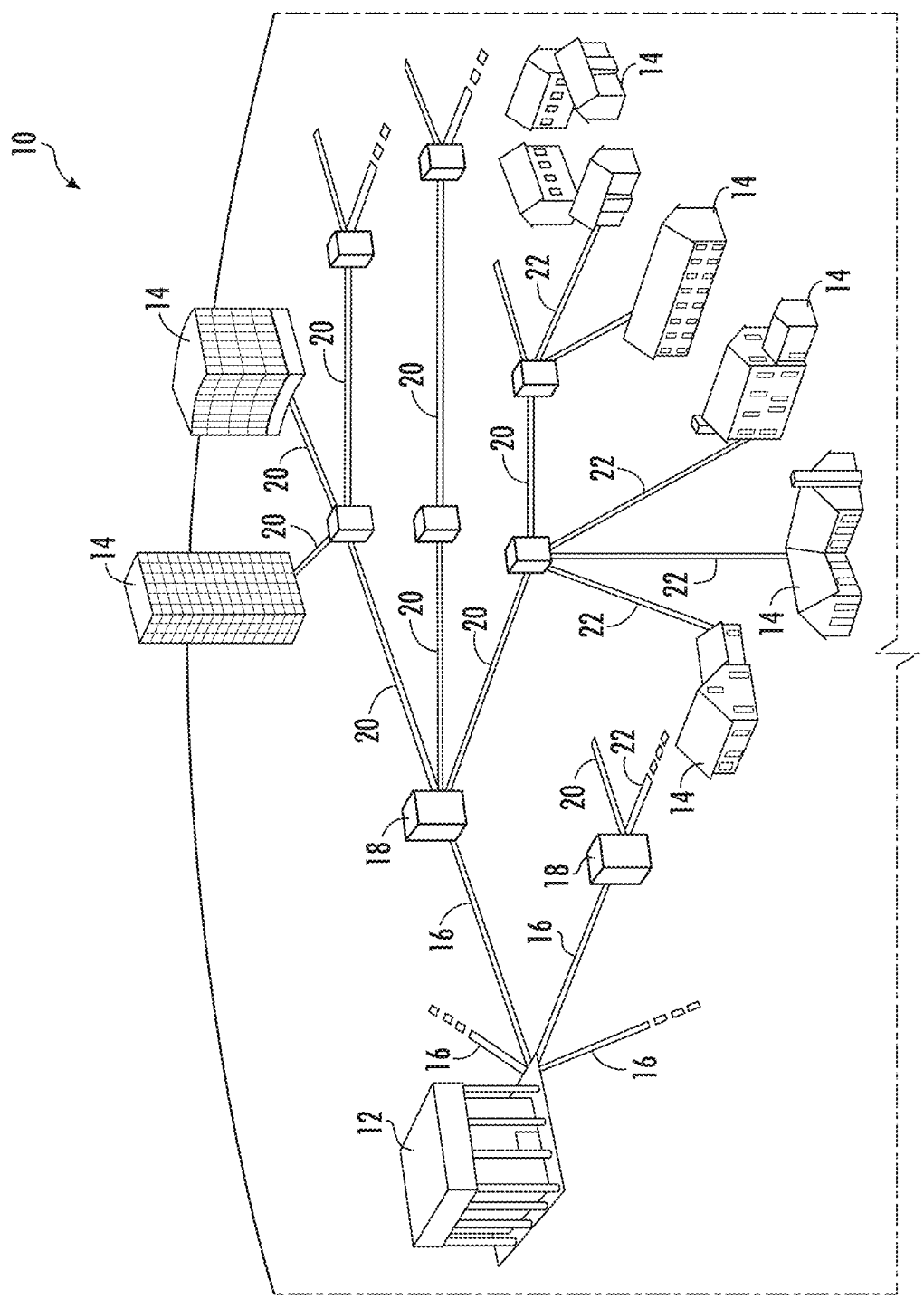
FIG. 1 is a schematic diagram of an exemplary FTTx network according to an example embodiment.

The embodiments set forth in the drawings are illustrative in nature and not intended to be limiting of the scope of the detailed description or claims. Whenever possible, the same reference numeral will be used throughout the drawings to refer to the same or like features. The drawings are not necessarily to scale for ease of illustration an explanation.

DETAILED DESCRIPTION

Various embodiments will be further clarified by examples in the description below. In general, the present disclosure relates to a fiber optic assembly having a splice tray that increases spatial efficiency within the fiber optic assembly and within the splice tray. The splice tray may be inserted and/or removed from a terminal without utilization of tools. Additionally, the splice tray may be configured to enable one handed insertion or removal, which may be advantageous, such as in small terminals or confined spaces. The splice tray also provides an efficient routing pattern of optical fibers to enable larger diameter optical fibers to be routed within the splice tray and the terminal.

Optical fibers are useful in a wide variety of applications, including the telecommunications industry for voice, video, and data transmissions. The benefits of optical fiber are well known and include higher signal-to-noise ratios and increased bandwidth compared to conventional copper-based transmission technologies. To meet modern demands for increased bandwidth and improved performance, telecommunication networks are increasingly providing optical fiber connectivity closer to end subscribers. These initiatives include fiber-to-the-node (FTTN), fiber-to-the-premises (FTTP), fiber-to-the-home (FTTH), and the like (generally described as FTTx).

In an FTTx network, fiber optic cables are used to carry optical signals to various distribution points and, in some cases, all the way to end subscribers. For example, FIG. 1 is a schematic diagram of an exemplary FTTx network 10 that distributes optical signals generated at a switching point 12 (e.g., a central office of a network provider) to subscriber premises 14. Optical line terminals (OLTs; not shown) at the switching point 12 convert electrical signals to optical signals. Fiber optic feeder cables 16 then carry the optical signals to various local convergence points 18, which act as locations for splicing and making cross-connections and interconnections. The local convergence points 18 often include splitters to enable any given optical fiber in the fiber optic feeder cable 16 to serve multiple subscriber premises 14. As a result, the optical signals are "branched out" from the optical fibers of the fiber optic feeder cables 16 to optical fibers of distribution cables 20 that exit the local convergence points 18.

At network access points closer to the subscriber premises 14, some or all of the optical fibers in the distribution cables 20 may be accessed to connect to one or more subscriber premises 14. Drop cables 22 extend from the network access points to the subscriber premises 14, which may be single-dwelling units (SDU), multi-dwelling units (MDU), businesses, and/or other facilities or buildings. A SDU or MDU terminal may be disposed at the subscriber premises 14.

There are many different network architectures, and the various tasks required to distribute optical signals (e.g., splitting, splicing, routing, connecting subscribers) can occur at several locations. Regardless of whether a location is considered a switching point, local convergence point, network access point, subscriber premise, or something else, fiber optic equipment is used to house components that carry out one or more of the tasks. The fiber optic equipment may be assemblies that include connectors, switches, splitters, splices, or the like. The term "fiber optic assembly" will be used in this disclosure to generically refer to such equipment (or at least portions thereof). In some instances such equipment is located at a subscriber premises 14 in an FTTx network, although this disclosure is not limited to any particular intended use. Further, although an FTTx network 10 is shown in FIG. 1, the same considerations apply with respect to other types of telecommunication networks or environments.

Figure 2:
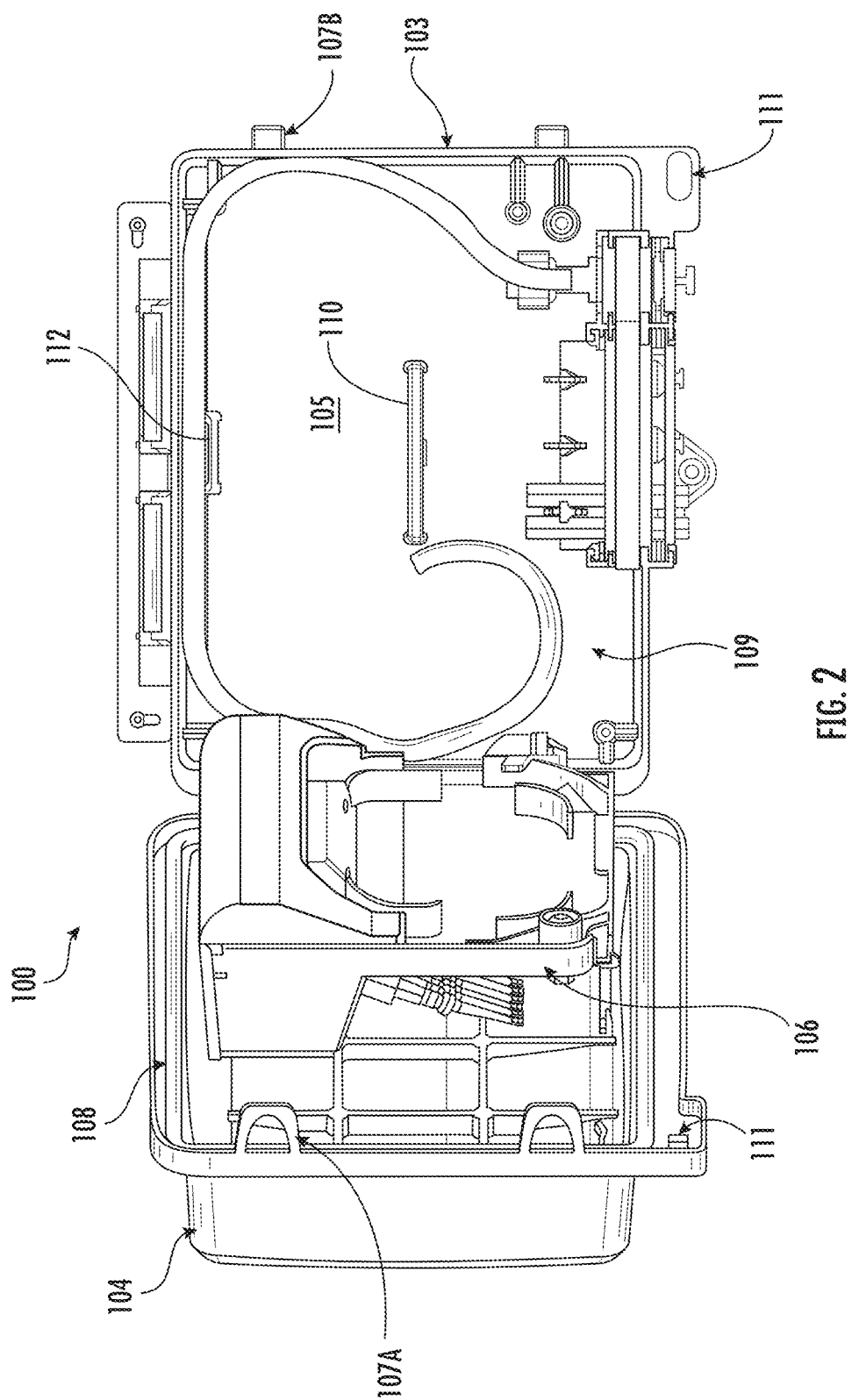
FIG. 2 illustrates a perspective view of an example fiber optic assembly according to an example embodiment.
Figure 2A:
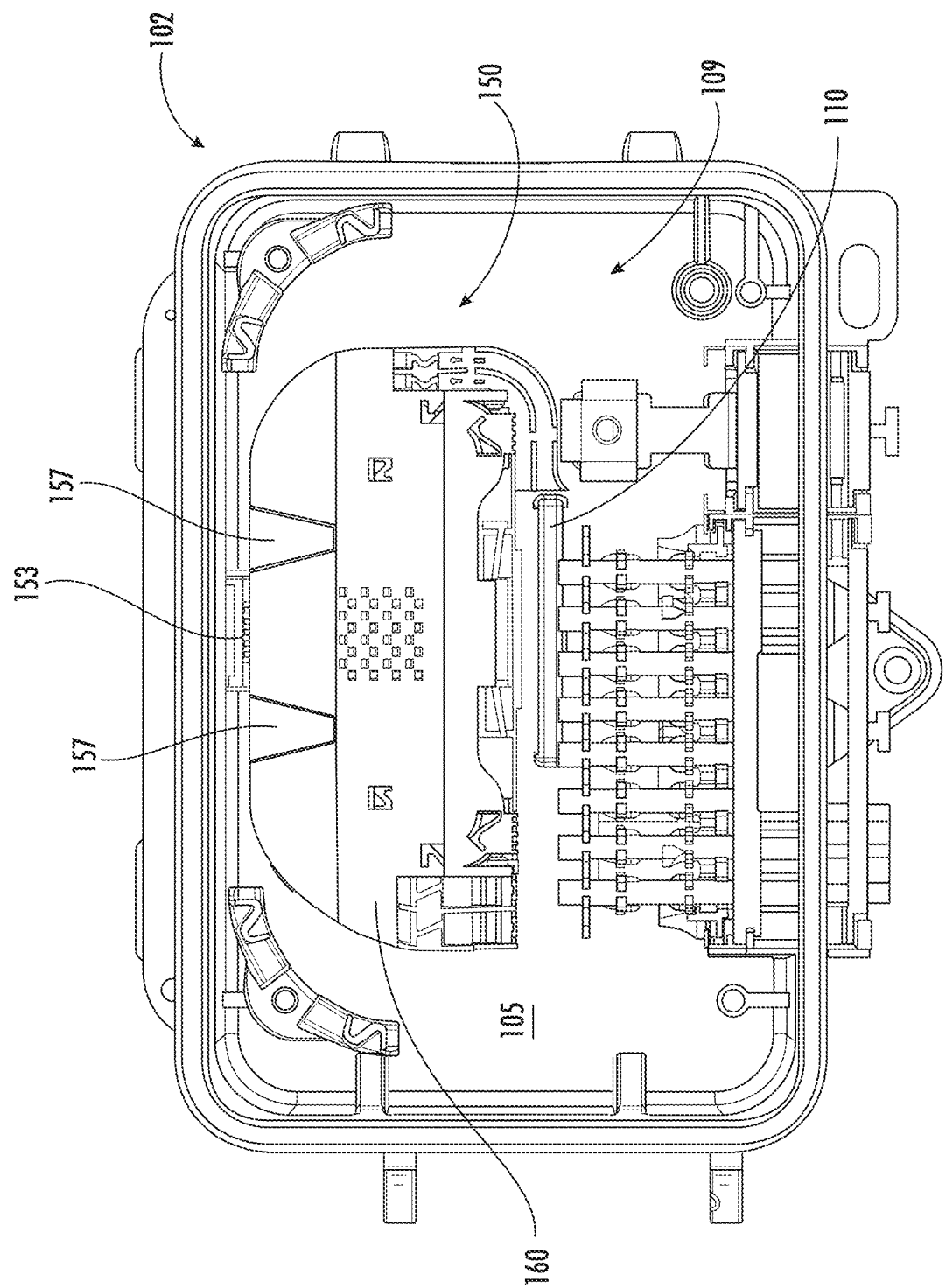
FIG. 2A is a top view of a base of the example fiber optic assembly of FIG. 2 having a splice tray according to an example embodiment.
Figure 2B:
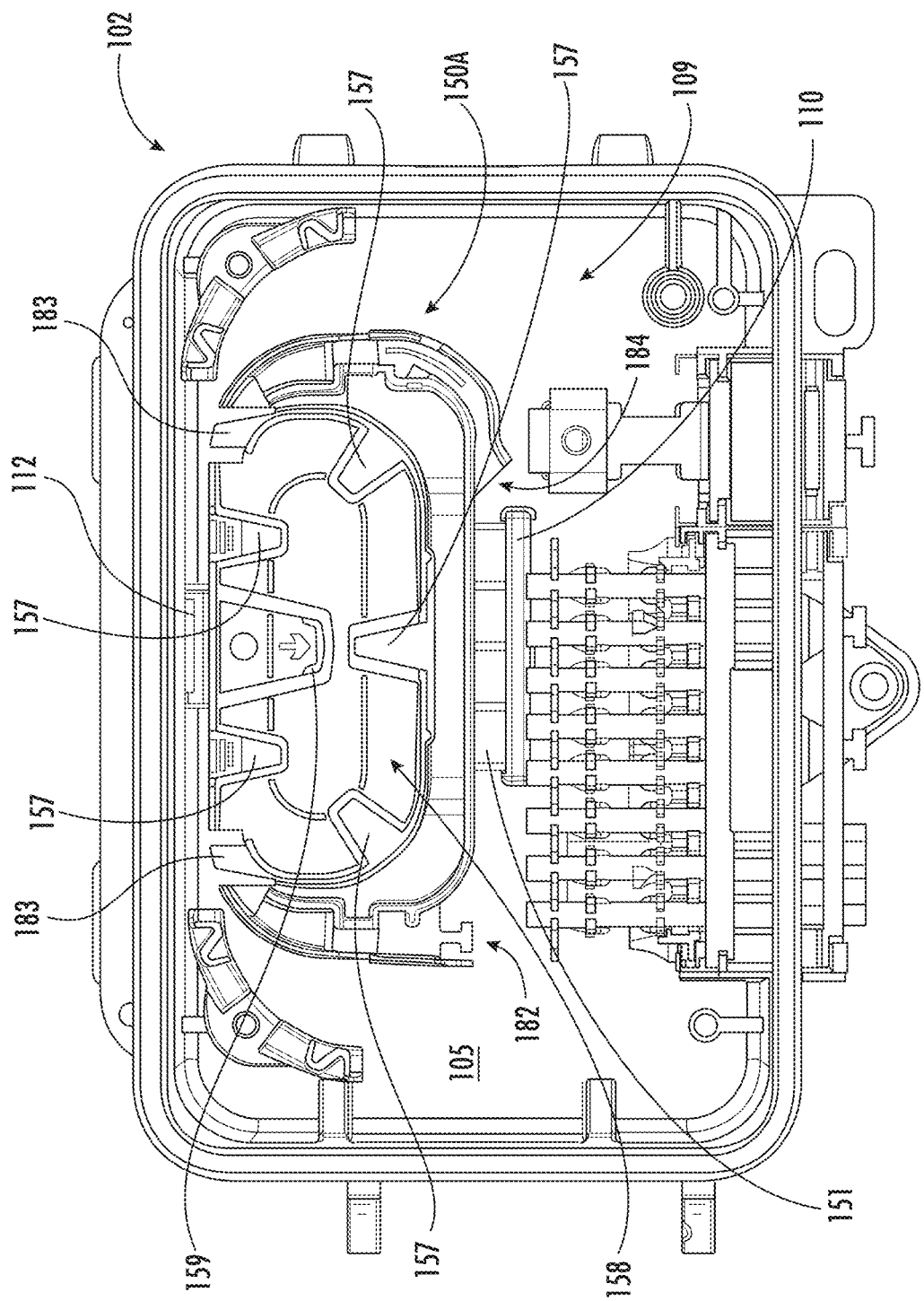
FIG. 2B is a top view of a base of the example fiber optic assembly of FIG. 2 having another embodiment of a splice tray according to an example embodiment.

Turning to FIG. 2, a fiber optic assembly or terminal 100 is provided. The depicted fiber optic assembly is an MDU terminal typically disposed at a multiple dwelling subscriber premises, such as a dorm, apartment building or complex, or the like. The fiber optic assembly 100 may include a base 102, a cover 104, and a midplane 106. The base 102 may be substantially planar and include a base surface 105, a sidewall 103 extending outward from the base surface 105 about at least a portion of the perimeter of base surface 105. Base surface 105 and sidewall 103 may be separate components or may be integrally formed. Base surface 105 and/or sidewall 103 may be formed from plastic, such as injection molded plastic, sheet metal, such as aluminum or steel, or other suitable material. Base surface 105 and sidewall 103 may form a terminal recess 109 configured to retain and/or protect fiber optic equipment including splice trays 150, 150A (FIGS. 2A and 2B, respectively) disposed within as discussed herein.

As shown in FIGS. 3 and 3A-3C, base 102 also includes a central fix point 110 and an edge fix point 112. Central fix point 110 is attached to base surface 105 within terminal recess 109 of base 102. Central fix point 110 is configured to couple to splice tray 150 when inserting or removing splice tray 150 from terminal 100. In particular, central fix point 110 cooperates with edge fix point 112 to couple a splice tray 150 to base 102 as discussed in greater detail herein. Additionally, as shown in at least FIGS. 3A-3C, central fix point 110 includes at least one aperture 110A, 110B that allows materials (e.g., Velcro® straps, zip ties, etc.) to be fed through, which can assist in fastening splice tray 150 or optical fiber bundles (not shown) to base 102. In some embodiments, central fix point 110 has two apertures 110A, 110B each providing a passage to allow materials to be fed through (e.g., hook and loop fastener straps, cable ties, etc.) which can assist in fastening splice tray 150 or optical fiber bundles to base 102.

Edge fix point 112 is coupled to base surface 105 where a gap exists between sidewall 103 and edge fix point 112. Edge fix point 112 is configured to couple to splice tray 150 when inserting or removing splice tray 150 from terminal 100. In particular, edge fix point 112 cooperates with central fix point 110 to couple splice tray 150 to base 102 as discussed in greater detail herein. While at least FIGS. 3A and 3B show an embodiment of the configuration of central fix point 110 and edge fix point 112, it is within the scope of the present disclosure that in alternate embodiments, alternate configurations of central fix point 110 and edge fix point 112 within base surface 105 may be used. Additionally, as shown in at least FIGS. 3A and 3B, edge fix point 112 includes an aperture 112A that allows materials (e.g., hook and loop fastener straps, etc.) to be fed through, which can assist in fastening splice tray 150 or optical fiber bundles to base 102. In some embodiments, where a splice tray 150 is not seated or engaged in base 102 via central fix point 110 and edge fix point 112, apertures 110A, 110B, 112A provide alternate fiber routing pathways to efficiently route optical fibers 180 within base 102.

Referring now to FIGS. 4A-4F, various views of splice tray 150 are shown. Splice tray 150 includes a base 152 and a splice cover 160. Base 152 includes a rear surface 154 having a perimeter and at least one edge surface 156 surrounding at least a portion of the perimeter of base 152 to define a recess 158 with rear surface 154 of base 152. The edge surface may be continuous or may be formed of one or more intermittent sections. Rear surface 154 is seated onto base surface 105 of base 102 and includes a handle 159. Handle 159 is configured to aid in assembly or disassembly of splice tray 150 as discussed in greater detail herein. In particular, handle 159 is operably coupled to an outer latch 153 such that actuating handle 159 can disengage outer latch 153 with edge fix point 112 as discussed herein. Handle 159 can be actuated because of relief cuts 167 that are present in base 152, which provide space for handle 159 to move or flex and thereby, actuate outer latch 153.

Edge surface 156 defines entry regions 182, 184 through which optical fibers 180 are inserted into splice tray 150, 150A as discussed in greater detail herein. Referring briefly to FIG. 4C, edge surface 156 includes slots 186, 188 leading into entry region 184. As shown, slot 186 is smaller in size and is in line with a divider 190 in entry region 184, which creates routing slots 184A. 184B configured to route optical fibers 180 into splice tray 150. Slot 186 has a width that is large enough to allow insertion of a tool (such as a screw-driver) to facilitate proper alignment of optical fibers 180 within routing slots 184A, 184B. Slot 188 is larger than slot 186 and has a corresponding width that enables a user to insert a finger into slot 188 and facilitate proper alignment of optical fibers 180 within routing slots 184A, 184B downstream of slot 186.

Figure 4E:
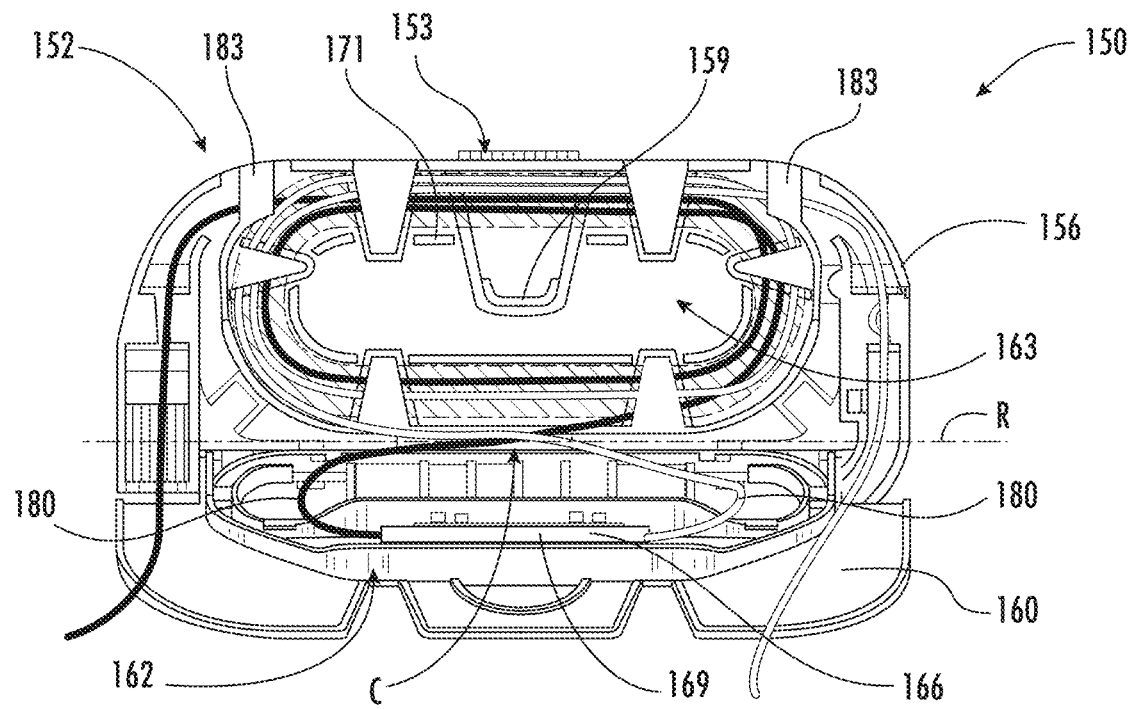
FIG. 4E is a top perspective view of the splice tray of FIG. 4A having optical fibers routed therethrough according to an example embodiment.
Figure 4F:
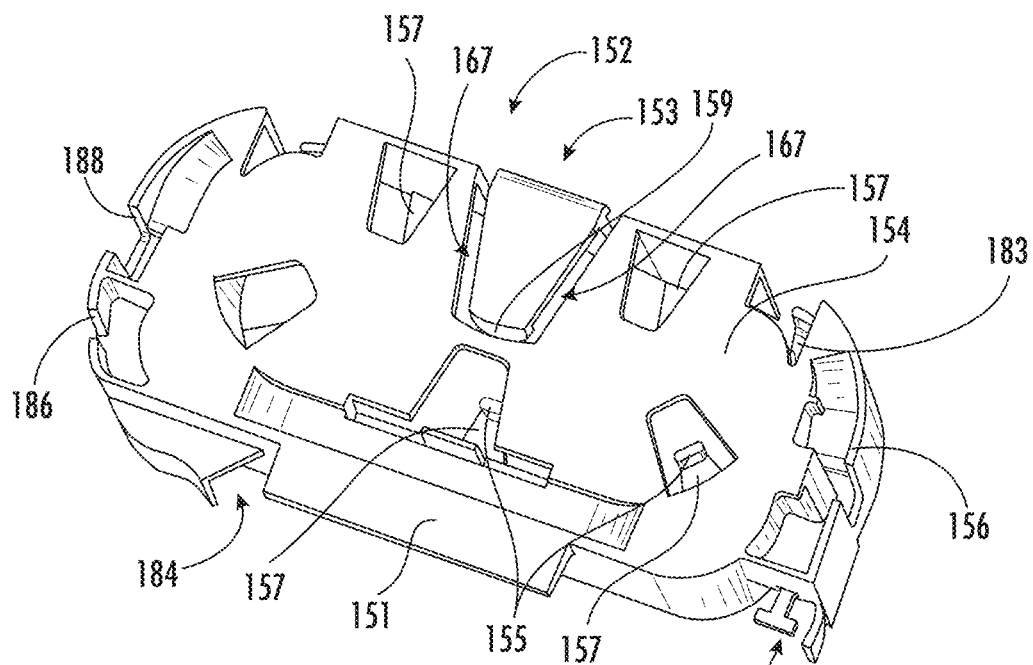
FIG. 4F is a rear perspective view of a base of the splice tray of FIG. 4A according to an example embodiment.
Figure 4G:
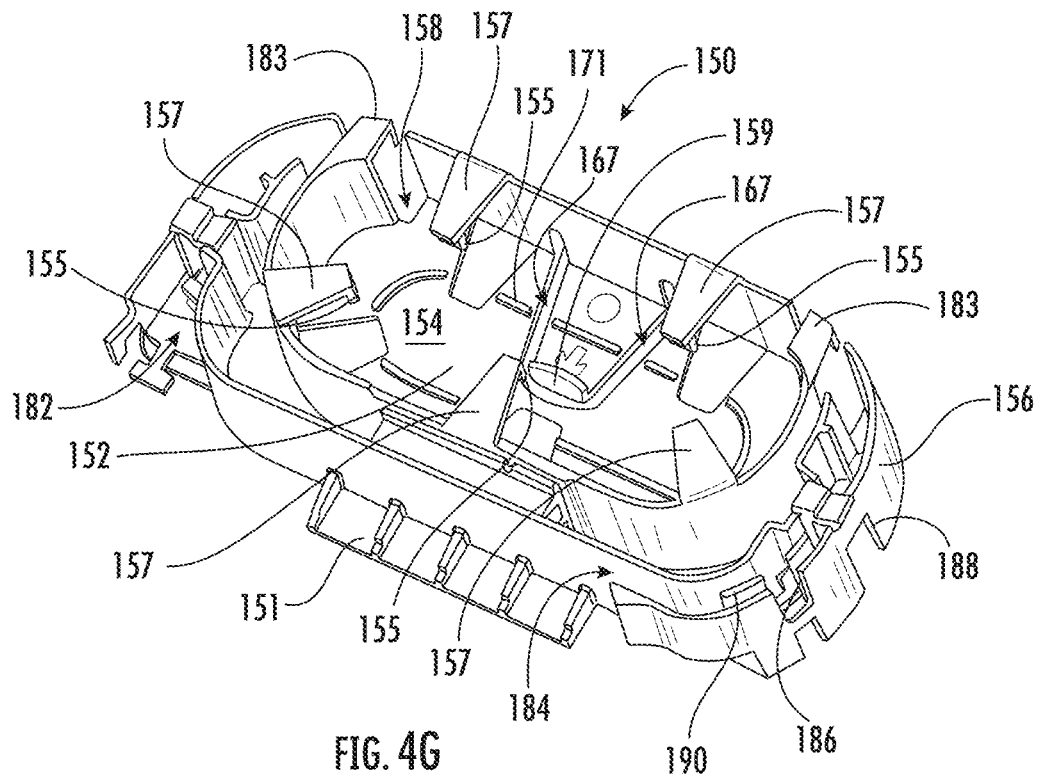
FIG. 4G is a perspective view of the base of FIG. 4F of the splice tray of FIG. 4A according to an example embodiment.
Figure 4H:
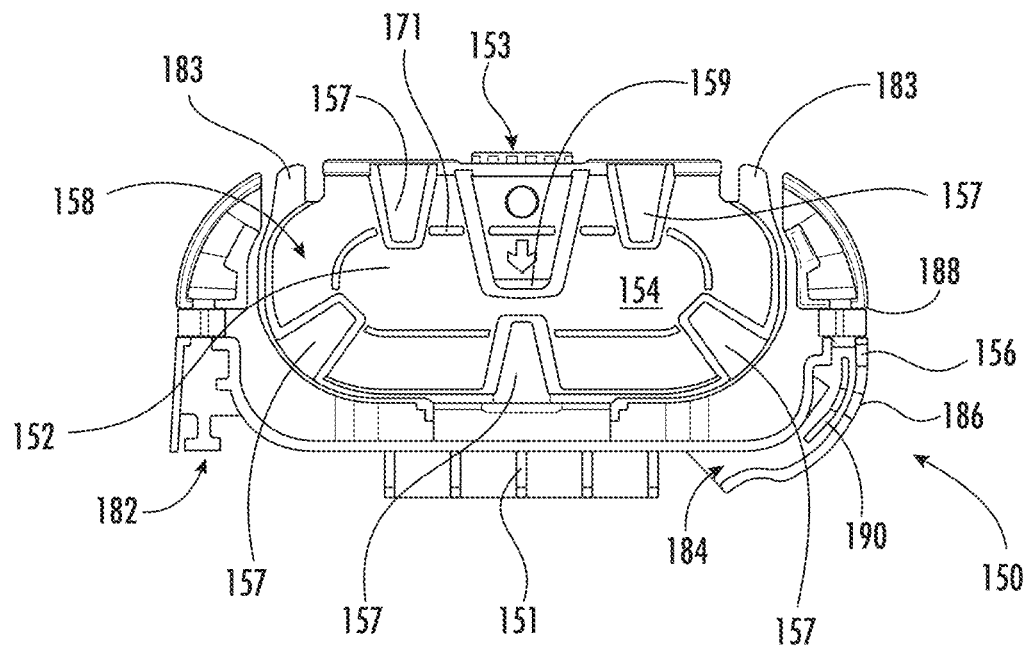
FIG. 4H is a top view of the base of FIG. 4F of the splice tray of FIG. 4A according to an example embodiment.

Edge surface 156 includes protrusions 157 about a circumference of edge surface 156, inner latch 151, and outer latch 153. Protrusions 157 are integrally formed with edge surface 156 and extend in the direction of recess 158. Protrusions 157 are configured to assist in routing optical fibers 180 through splice tray 150 as shown in FIG. 4E and, in some embodiments, to provide purchase of a splice holder 162A to be seated within base 152 as discussed herein. Protrusions 157 include an extension 155 that is integrally formed with protrusion 157 and extend downwards towards base 152 as shown. Extension 155 is configured to hold or maintain optical fibers 180 in a designated routing pattern such that optical fibers 180 do not enter sub recess 163 of base 152.

Inner latch 151 is integrally formed with edge surface 156 and extend in a direction away from recess 158. Inner latch 151 is configured to couple and decouple to central fix point 110 during assembly and disassembly respectively as discussed in greater detail herein. Similarly, outer latch 153 is integrally formed with edge surface 156 and extends in a direction away from recess 158 (protrudes from edge surface 156 away from recess 158. Outer latch 153 is configured to couple and decouple to edge fix point 112 during assembly and disassembly respectively as discussed herein. In particular, outer latch 153 is retractable and operably coupled to handle 159 such that actuation of handle 159 can retract outer latch 153 (as shown in FIG. 4J) and thereby disengage outer latch 153 with edge fix point 112 as discussed herein.

Splice cover 160 is hingedly coupled to the at least one edge surface 156 of base 152, wherein splice cover 160 is contoured to cover recess 158. In particular, splice cover 160 is hingedly coupled to the at least one edge surface 156 of base 152. Splice cover 160 includes hinges 172 that couple to protrusions 174 of base 152. Protrusions 174 are aligned to create a rotational axis R (when splice cover 160 is coupled to protrusions 174) about which splice cover 160 can rotate to transition splice tray 150 between an open configuration in which splice cover 160 does not cover recess 158 (FIG. 4D) and a closed configuration in which splice cover 160 covers recess 158 (FIG. 5B) as discussed in greater detail below. Splice cover 160 is modular in that features described herein can be added to or removed from splice cover 160 such that splice cover 160 is adaptable in different applications (e.g., splice holder 162 can be inserted to house mechanical or fusion spliced optical fibers or other kinds of spliced optical fibers).

Splice cover 160 also includes a splice holder 162 and a parking area 164. Splice holder 162 is configured to receive and organize splice joint(s) 166 within splice tray 150. In some embodiments, splice holder 162 is a splice cassette configured to hold multiple spliced optical fibers. In some embodiments, splice holder 162 is a mechanical splice holder. In some embodiments, splice holder 162 is a separate assembly part that couples to a designated area of splice cover 160, which provides flexibility in terms of the type of splice holder 162 that can be coupled to splice cover 160. Splice holder 162 includes slots 168 that are configured to house splice joint(s) 166 within splice holder 162. As shown in at least FIG. 4B, each of slots 168 have a longitudinal axis A such that slots 168 and housed splice joint(s) 166 are substantially parallel with each other. In some embodiments, splice cover 160 is configured to house various types of splice joint(s) 166 and corresponding splice protectors/sleeve covers as applicable such as fusion spliced optical fibers with either a mechanical protective cover of splice joints 166 or a heat shrink protective cover 169 (FIG. 4B) of splice joints 166 or mechanical spliced optical fibers (without fusion splicing). In some embodiments, there are multiple splice holders 162 in splice cover 160. In some embodiments, splice holder 162 has variable lengths L and variable diameters D that are determined by the dimensions of spliced optical fibers 180, splice joints 166, and the corresponding protective covers as discussed above.

Figure 6:
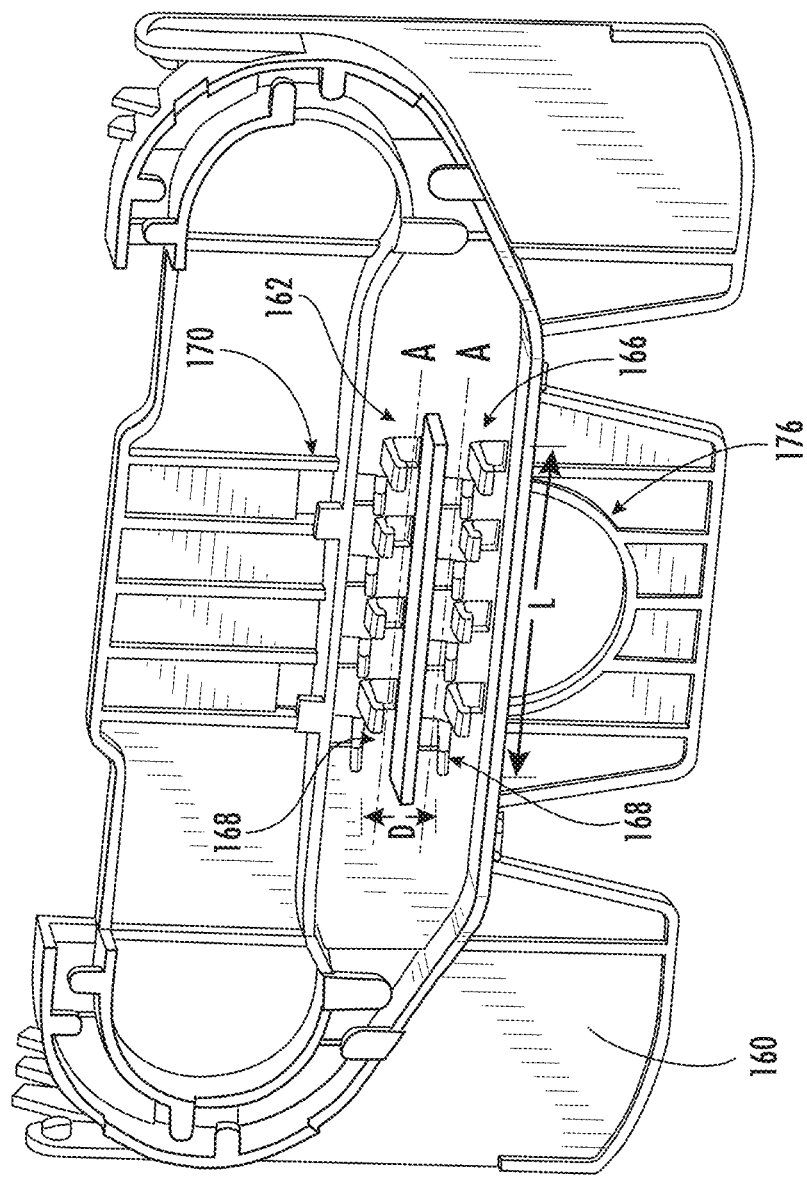
FIG. 6 is a perspective view of the splice cover shown in FIG. 5A according to an example embodiment.

Referring briefly to FIG. 6, parking area 164 is an area that is adjacent to slots 168 of splice holder 162. As shown, parking area 164 includes a parking slot 170 that is configured to receive and house splice joints 166 from slots 168. In particular, in some embodiments, where a splice joint 166 is damaged or in need of repair, the damaged splice joint 166 can be removed from slots 168 and placed in parking area 164 for repair.

Figure 5A:
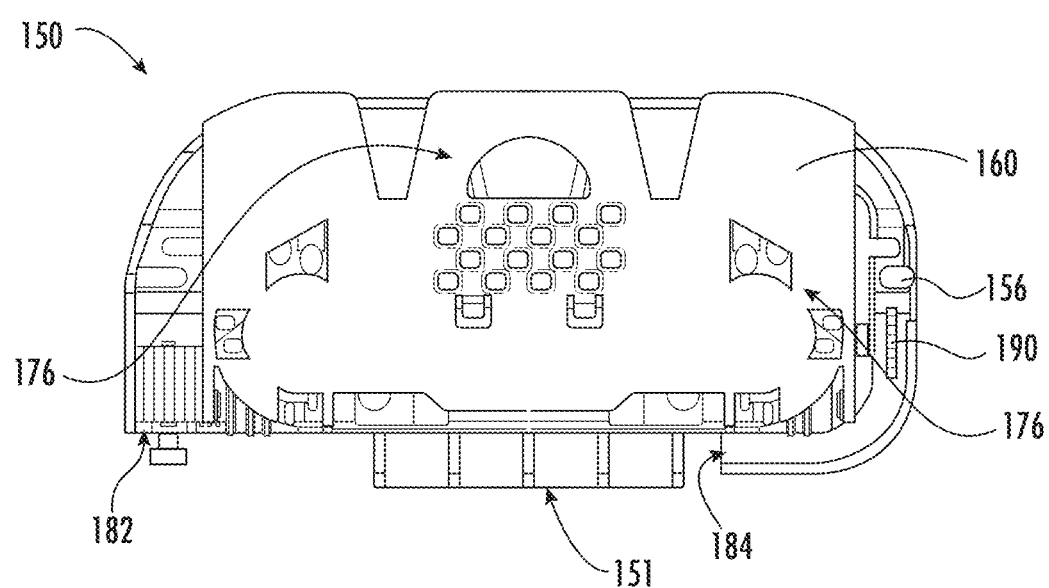
FIG. 5A is a top view of the splice tray of FIG. 4A in a closed configuration with a splice cover applied onto the splice tray according to an example embodiment.

Splice cover 160 also includes aperture(s) 176 as shown in at least FIG. 5A. Aperture(s) 176 are configured to allow operators to open or close splice cover 160 of splice tray 150 (transitioning splice tray 150 between open and closed configurations) with a single finger when the single finger is inserted into at least one of apertures 176.

Figure 5B:
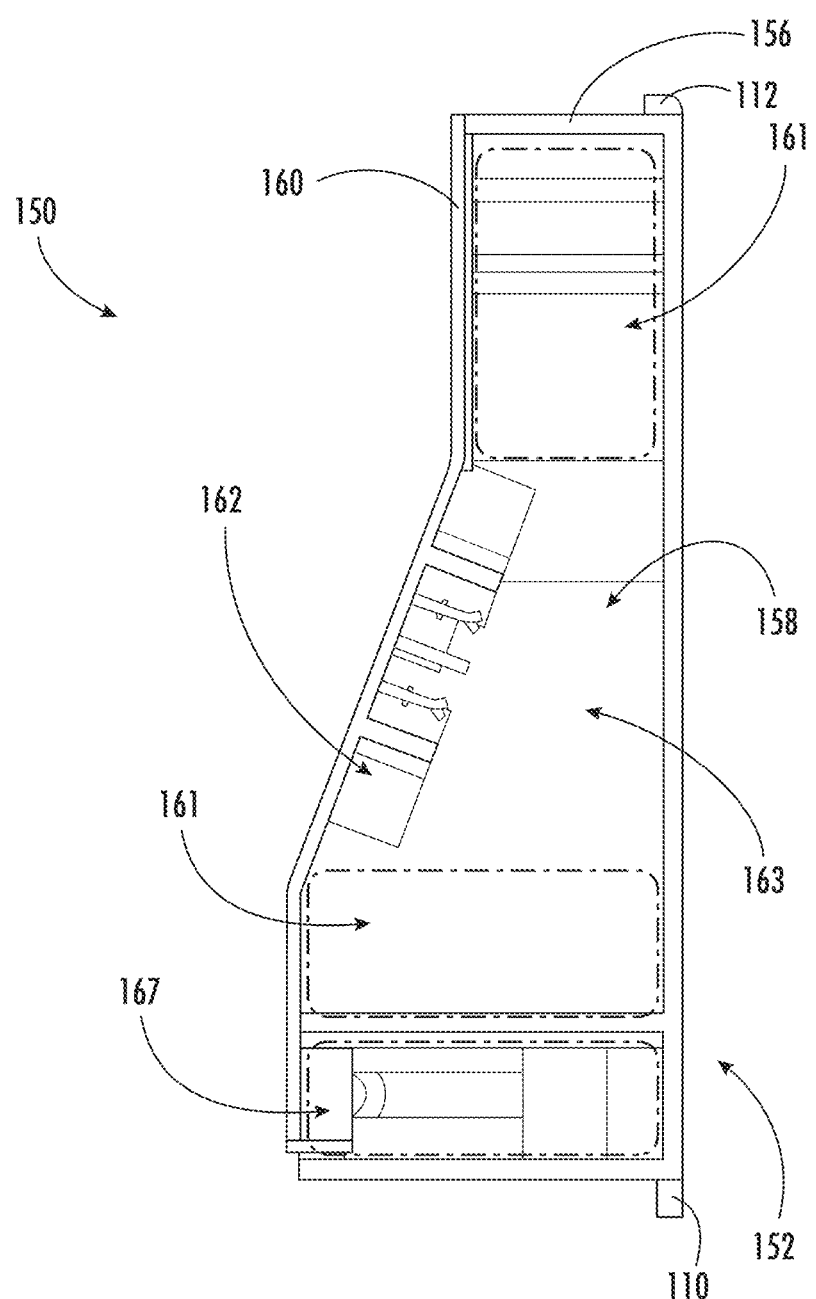
FIG. 5B is a cross sectional side view of the splice tray of FIG. 5A illustrating optical fiber routing within the splice tray according to an example embodiment.

As mentioned previously, splice cover 160 is hingedly coupled to the at least one edge surface 156 of base 152. Splice cover 160 includes hinges 172 that couple to protrusions 174 of base 152. Protrusions 174 are aligned to create a rotational axis R (when splice cover 160 is coupled to protrusions 174) about which splice cover 160 can rotate to transition splice tray 150 between an open configuration in which splice cover 160 does not cover recess 158 (FIG. 4D) and a closed configuration in which splice cover 160 covers recess 158 (FIG. 5B). In the closed configuration, efficient fiber routing is possible. As shown in FIG. 5B, the closed configuration of splice tray 150 yields storage area 161 configured to route optical fibers 180 circumferentially around splice holder 162 and a sub recess 163 having a size that substantially corresponds to splice holder 162. Advantageously, by not including splice holder 162 base 152, splice tray 150 is more spatially efficient when routing optical fibers 180 as there is more space within splice tray 150 that optical fibers 180 can be stored/routed. In particular, with reference to FIG. 4E, optical fibers 180 are fed through entry regions 182, 184 of base 152, and optical fibers 180 are routed through recess 158 of splice tray 150. In some embodiments, entry regions 182, 184 include additional structures (e.g., foam routing block) to guide optical fibers 180 through entry regions 182, 184 and corresponding slots. As shown, optical fibers 180 are circumferentially routed around sub recess 163 via a clip 183, extensions 155 of protrusions 157, and routing boundaries 171 where routing boundaries 171 serve to prevent movement of optical fibers 180 into sub recess 163. Also, as shown, there is a crossover region C in which optical fibers 180 cross paths before entering splice cover 160. In crossover region C, optical fibers 180 cross each other along rotational axis R. Stated another way, optical fibers 180 cross each other in crossover region C such that optical fibers 180 are substantially parallel with rotational axis R. Such a routing configuration reduces strain applied onto optical fibers 180 as optical fibers 180 are routed through splice tray 150. Also, by routing optical fibers 180 in this way, splice tray 150 incorporates slack storage for routed optical fibers 180. That is, slack storage is provided within splice tray 150 such that if a splice on splice cover 160 needs to be severed and redone, optical fibers 180 have enough slack to accommodate the necessary pull force applied onto optical fibers 180 to route optical fibers 180 for splicing. Moreover, larger optical fibers 180 can be routed through splice tray 150. In some embodiments, optical fibers 180 that are routed through splice tray 150 have an outer diameter of up to 900 μm.

In an alternative embodiment, the cover 160 may include latch features similar to the inner latch 151 and out latch 153 and the splice tray may include recesses, similar to the center recess 110 and edge recess 112. This configuration may enable the cover 160 to be installed onto the splice tray 150 in a manner similar to the splice tray 150 into the recess 109.

Referring now to FIG. 7A, an alternate splice tray 150A is shown. Splice tray 150A is substantially the same as splice tray 150 except as noted herein. As shown, splice tray 150A is a coverless splice tray. Similar to splice tray 150, splice tray 150A includes a splice holder 162A that is configured to receive and organize splice joint(s) 166 within splice tray 150A. Splice holder 162A is attached to at least one edge surface 156 of base 152 and protrudes into recess 158. Splice holder 162A includes slots 168A that have a longitudinal axis parallel to edge surface 156.

Splice holder 162A also includes coupling channels 178A, 178B. Coupling channels 178A, 178B are positioned on opposite surfaces of splice holder 162A and are configured to engage with one of protrusions 157 (by feeding protrusion 157 through an aperture 179 of coupling channel 178A) and an inner wall segment 165 (by feeding inner wall segment 165 through an aperture 181 of coupling channel 178B) of edge surface 156, respectively, to couple splice holder 162A to at least one edge surface 156. In some embodiments, splice holder 162A is coupled to one of protrusions 157 (via coupling channel 178A) and inner wall segment 165 (via coupling channel 178B) in a snap fit configuration.

Figure 7D:
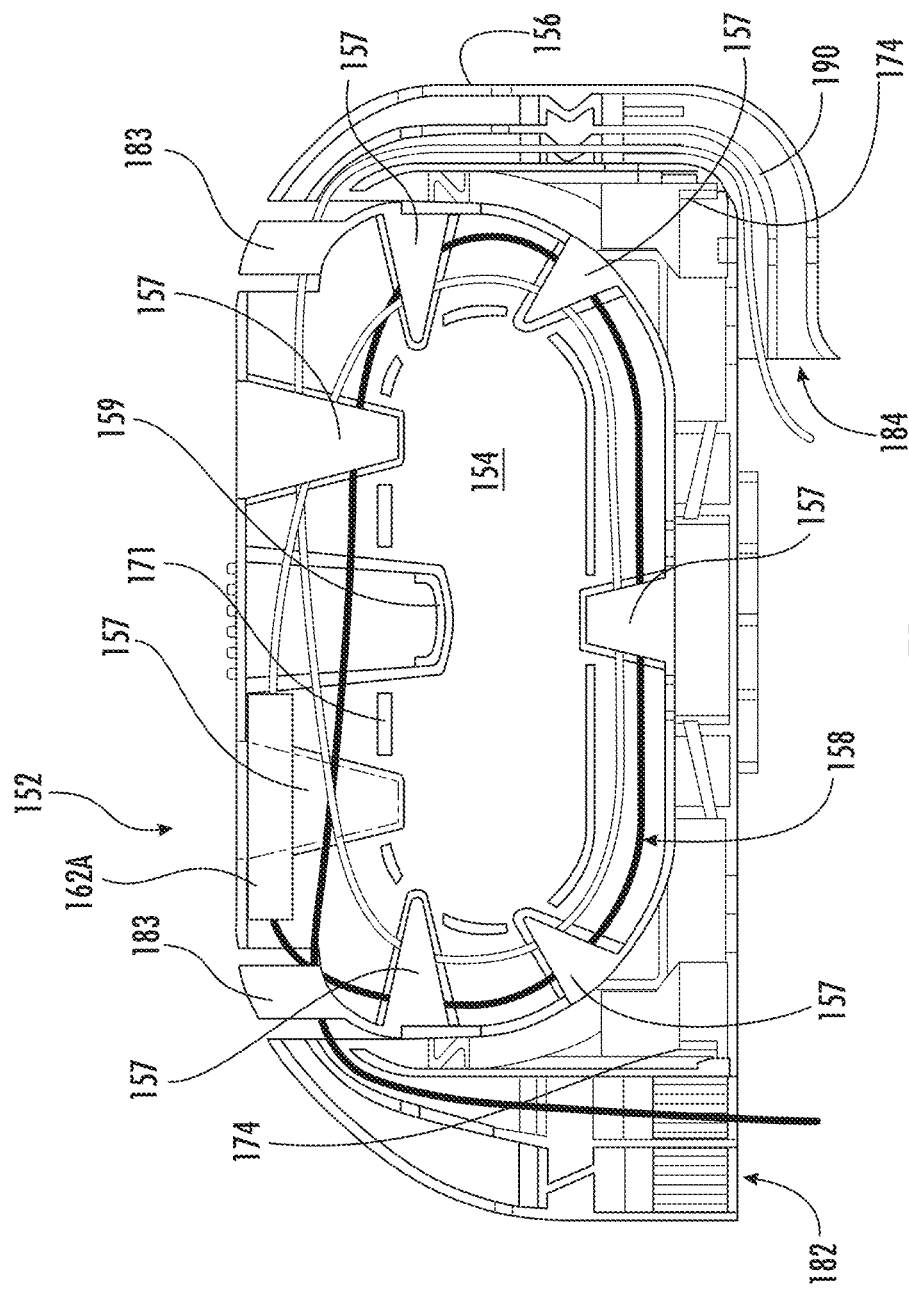
FIG. 7D is a top perspective view of the splice tray of FIGS. 7A-7C having optical fibers routed therethrough according to an example embodiment.
Figure 7E:
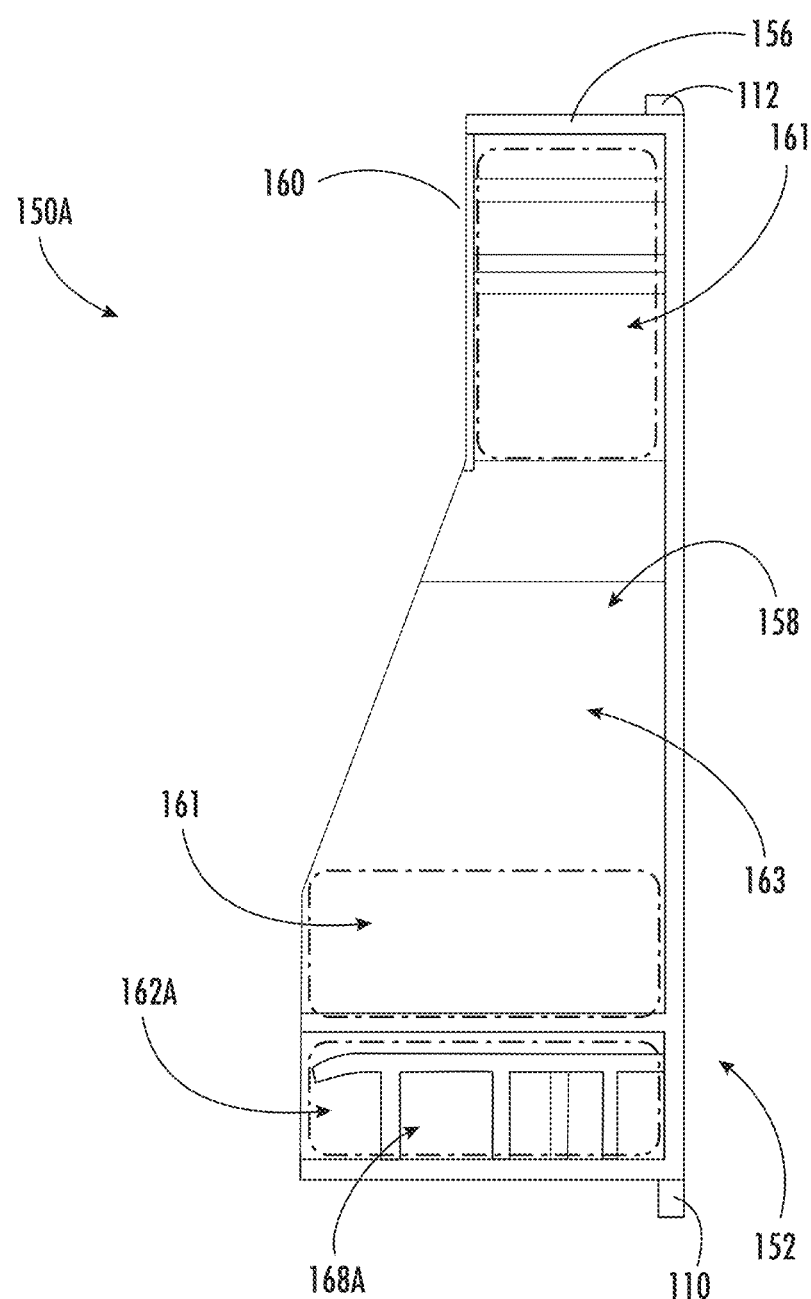
FIG. 7E is a cross sectional side view of the splice tray of FIG. 7A illustrating optical fiber routing within the splice tray according to an example embodiment.

As assembled, splice tray 150A provides efficient fiber routing similar to splice tray 150. Referring to FIGS. 7D and 7E, splice tray 150A yields storage area 161 that is configured to route optical fibers 180 circumferentially around recess 158. In particular, optical fibers 180 are fed through entry regions 182, 184 of base 152, and optical fibers 180 are routed through recess 158 of splice tray 150. In some embodiments, entry regions 182, 184 include additional structures (e.g., foam routing block) to guide optical fibers 180 through entry regions 182, 184 and corresponding slots. As shown, optical fibers 180 are circumferentially routed around sub recess 163 via extensions 155 of protrusions 157 and routing boundaries 171, which serve to prevent movement of optical fibers 180 into sub recess 163. Also, as shown, optical fibers 180 terminate in splice holder 162A. Similar to splice tray 150, such a routing configuration reduces strain applied onto optical fibers 180 as optical fibers 180 are routed through splice tray 150A. Also, by routing optical fibers 180 in this way, splice tray 150A incorporates slack storage for routed optical fibers 180. That is, slack storage is provided within splice tray 150 such that if a splice on splice cover 160 needs to be severed and redone, optical fibers 180 have enough slack to accommodate the necessary pull force applied onto optical fibers 180 to route optical fibers 180 for splicing. Moreover, larger optical fibers 180 can be routed through splice tray 150. In some embodiments, optical fibers 180 that are routed through splice tray 150 have an outer diameter of up to 900 µm. In addition, larger optical fibers 180 can be routed through splice tray 150A. In some embodiments, optical fibers 180 that are routed through splice tray 150A have an outer diameter of up to 900 µm.

Referring back to FIGS. 7A-7C, a method of inserting splice holder 162A into splice tray 150A is shown. Referring first to FIGS. 7A and 7B, splice holder 162A is lowered along direction D1 into recess 158 of splice tray 150A such that coupling channels 178A, 178B are aligned with protrusion 157 and inner wall segment 165 of edge surface 156. Then, as shown in FIG. 7C, splice holder 162A is moved laterally along direction D2 towards edge surface 156 such that apertures 179, 181 of coupling channels 178A, 178B receive protrusion 157 and inner wall segment 165, respectively, to couple splice holder 162A to edge surface 156. As mentioned previously, in some embodiments, splice holder 162A is coupled to one of protrusions 157 (via coupling channel 178A) and inner wall segment 165 (via coupling channel 178B) in a snap fit configuration.

To remove splice holder 162A from splice tray 150A, the above-mentioned steps are reversed. That is, splice holder 162A is first moved in direction D2 towards recess 158 to disengage/decouple splice holder 162A from edge surface 156. Then, splice holder 162A is moved along direction D1 away from recess 158 and splice tray 150A to remove splice holder 162A.

Figure 8A:
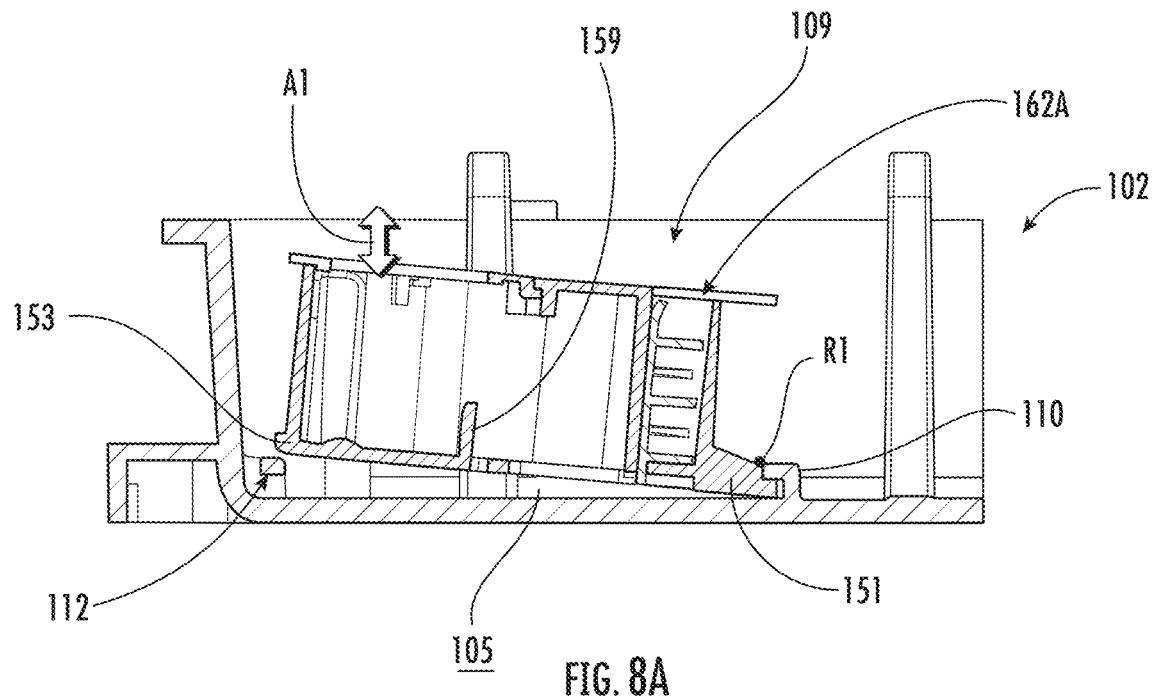
FIGS. 8A-8B illustrate a method of inserting the splice tray of FIG. 7A into the base of FIGS. 3A-3C of the fiber optic assembly of FIG. 2 according to an example embodiment.
Figure 8B:
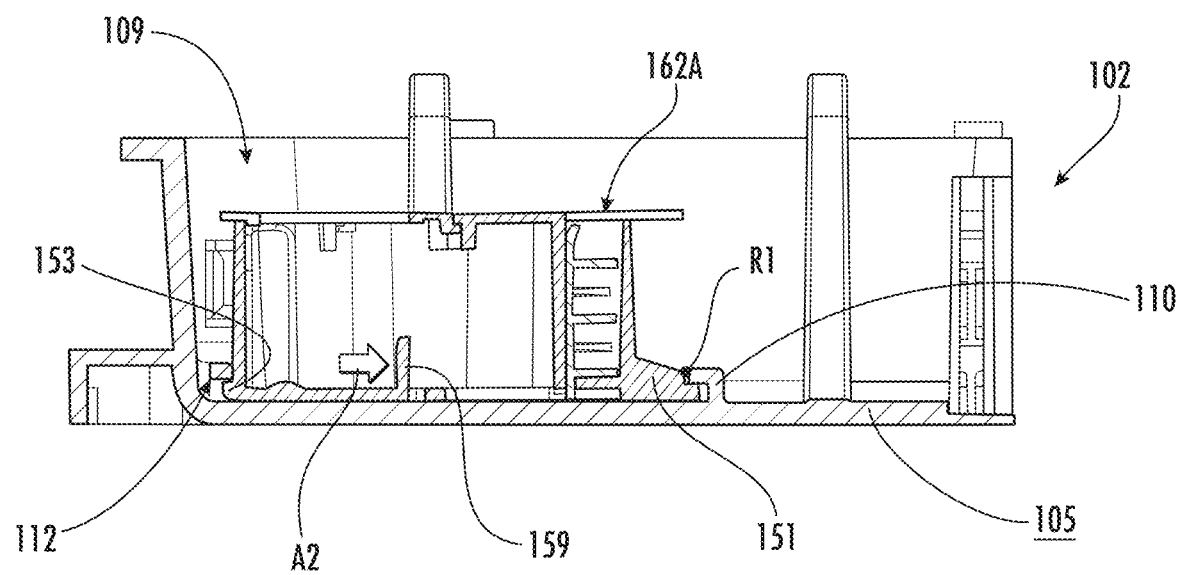
Figure 9A:
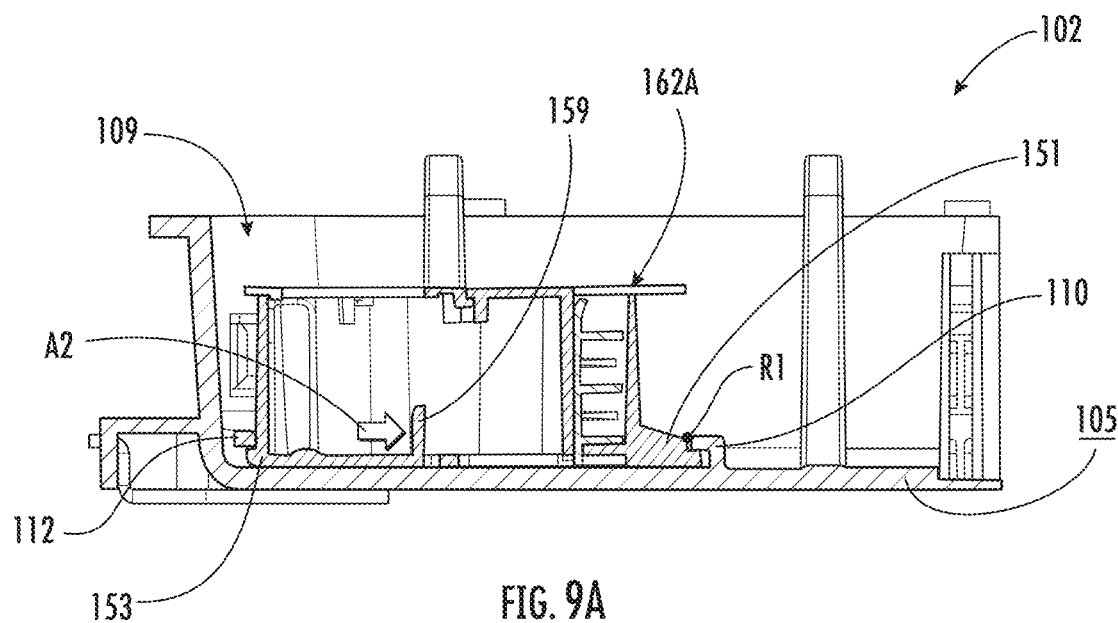
FIGS. 9A-9B illustrate a method of removing the splice tray of FIG. 7A from the base of FIGS. 3A-3C of the fiber optic assembly of FIG. 2 according to an example embodiment.
Figure 9B:
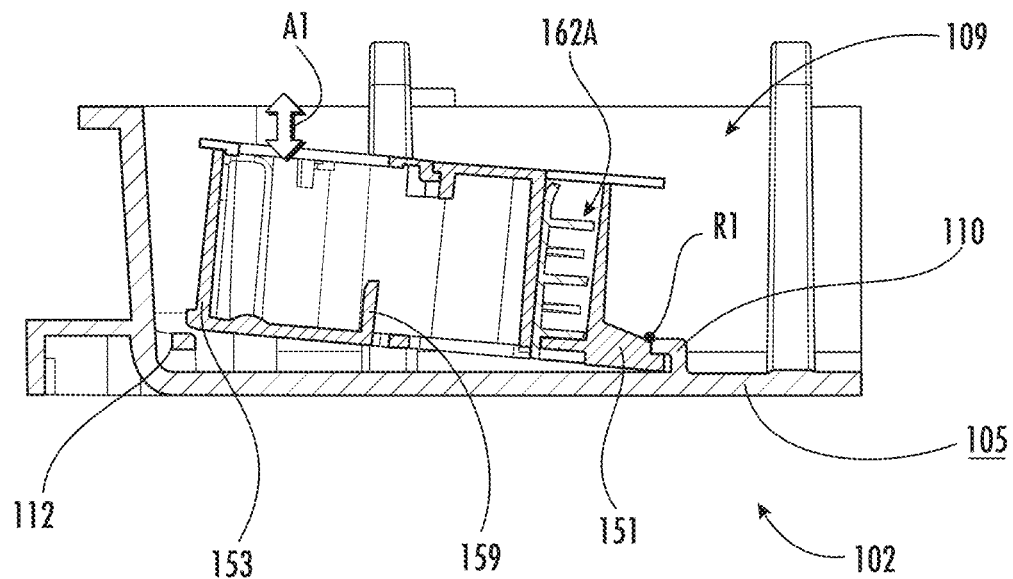

Referring now to FIGS. 8A and 8B, a method of inserting splice tray 150A into base 102 of terminal 100 is shown. Referring first to FIG. 9A, splice tray 150A is lowered into terminal recess 109 of base 102 along direction A1 where inner latch 151 couples to central fix point 110 as shown. Then, as shown in FIG. 8B, handle 159 is actuated along direction A2 to retract outer latch 153 (as shown in FIG. 4J) to allow a remainder of splice tray 150A to be lowered onto base surface 105 of base 102. After splice tray is lowered onto base surface 105 (where rear surface 154 of base 152 of splice tray 150A contacts base surface 105), handle 159 is no longer actuated such that outer latch 153 protrudes from edge surface 156 (as shown in FIG. 4I) and engages with edge fix point 112.

To remove splice tray 150A from base 102 of terminal 100, the above-mentioned steps are reversed. That is, handle 159 is actuated along direction A2 to retract outer latch 153 and disengage outer latch 153 from edge fix point 112. Then, splice tray 150A is moved along direction A1 away from terminal recess 109 to remove splice tray 150A.

Referring back to FIG. 2, cover 104 may be hingedly attached to base 102 or sidewall 103. Cover 104 may be configured to transition between an open position allowing access to the fiber optic equipment and a closed position limiting or preventing access to the fiber optic equipment. Cover 104 may be configured to engage at least a portion of sidewall 103 to enclose a portion of fiber optic assembly or terminal 100. In some example embodiments, a sealing element 108, such as a foam, rubber, or silicone gasket, may be disposed between cover 104 and sidewall 103 to resist entry of liquid, moisture, and/or debris. In some examples, fiber optic assembly 100 may be configured with an ingress protection (IP) rating of IP 55, IP 65, or the like.

Cover 104 may include one or more latch features configured to retain cover 104 in the closed position. Latch features 107 may include one or more projections or catches 107B disposed on the sidewall 103. Cover 104 may include a tab 107A configured to engage the catch 107B. Tab 107A and catch 107B may be complementary and biased toward each other, such that when the cover 104 is transitioned to the closed position the latch features 107 engage to resist movement of the cover 104 toward the open position. Additionally or alternatively, the fiber optic assembly 100 may include a tamper prevention feature 111. Tamper prevention feature 111 may include a pair of aligned apertures disposed on the cover 104 and the sidewall 103 or base 102. When the cover 104 is in the closed position a tamper seal, or lock, may be disposed through the apertures. As such, the lock and/or tamper seal would necessarily be removed to transition the cover 104 to the open position.

In an example embodiment, cover 104 may include a connector parking feature disposed on an inner surface of cover 104. The connector parking feature may include one or more adapter type apertures configured to receive and retain a fiber optic connector when not in use. In some embodiments, the connector parking feature may include a receiver configured to accept and retain a block of adapter type apertures. For example, some splitter modules may be packaged with a block of adapter type apertures for protection and organization. The block of adapter type apertures including their associated fiber optic connectors may be installed into the receiver. When a new subscriber service is desired, the connector may be removed from the connector parking feature and installed into the appropriate adapter, as described below.

Midplane 106 may separate a first portion of the fiber optic assembly 100 from a second portion of the fiber optic assembly 100. For example, the midplane 106 may separate a "day one" installation area from a "day two" installation area. The day one installation area may include one or more of cable entry, cable strain relief, splicing, splitter installation, or the like. These operation are typically performed at the time the fiber optic assembly 100 is deployed. Day two operations typically include connection of one or more optical fibers at a patch field or patch panel. As such, the midplane 106 acts as a barrier between a higher skill level installation area and a lower skill level installation area. Additionally, the components and connections in the day one installation area may be significantly more susceptible to damage than components residing in the day two installation area. The midplane 106 need not be in an exact middle of the fiber optic assembly 100, as the term "midplane" is merely used to refer to a separation element between two areas of the fiber optic assembly 100.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A splice tray comprising:
a tray base having a rear surface and at least one edge surface surrounding at least a portion of a perimeter of the tray base, the tray base and the at least one edge surface defining a recess therein;
a splice cover removably coupled to the edge surfaces of the tray base, wherein the cover is configured to at least partially enclose the recess, wherein the splice cover includes at least one splice holder received in the recess of the tray base when the splice cover covers the recess;
an inner latch extending from the edge surface and configured to engage a first fix point of a terminal base of a terminal;
an outer latch extending from the edge surface and disposed opposite to the inner latch; wherein the outer latch is configured to engage a second fix point disposed in the terminal base of the terminal; and
a handle within the tray base and coupled to the outer latch such that when the handle is actuated, the outer latch disengages from the second fix point and the splice tray is decoupled from the terminal base.

2. The splice tray of claim 1, wherein when the splice cover covers the recess, the splice tray includes a storage area configured to route optical fibers circumferentially around the at least one splice holder.

3. The splice tray of claim 1, wherein the splice cover further comprises a parking area adjacent to the at least one splice holder.

4. The splice tray of claim 1, wherein the splice cover includes an aperture to enable a finger lever release to open the cover of the splice tray.

5. The splice tray of claim 1, wherein the handle is positioned on the rear surface of the tray base and the handle includes at least one aperture.

6. The splice tray of claim 5, wherein the at least one aperture receives optical fibers routed within the splice tray and the terminal.

7. The splice tray of claim 1, wherein the splice tray can route optical fibers having an outer diameter of up to 900 µm.

8. A splice tray comprising:
a tray base having a rear surface and at least one edge surface surrounding at least a portion of a perimeter of the tray base, the tray base and the at least one edge surface defining a recess therein;
an inner latch extending from the edge surface and configured to engage a first fix point of a terminal base of a terminal;
an outer latch extending from the edge surface and disposed opposite to the inner latch; wherein the outer latch is configured to engage a second fix point disposed in the terminal base of the terminal; and
a handle within the tray base and coupled to the outer latch such that when the handle is actuated, the outer latch disengages from the second fix point and the splice tray is decoupled from the terminal base.

9. The splice tray of claim 8, further comprising at least one splice holder coupled to the at least one edge surface, the at least one splice holder having at least one slot, wherein the at least one slot has a longitudinal axis parallel to the at least one edge surface.

10. The splice tray of either claim 9, wherein the at least one splice holder is coupled to the at least one edge surface by snap fit, wherein a protrusion of the at least one edge surface engages with a coupling channel having an aperture, wherein the protrusion is inserted into the aperture of the coupling channel.

11. The splice tray of claim 8, wherein the handle is positioned on the rear surface of the tray base.

12. The splice tray of claim 8, wherein the splice tray can route optical fibers having an outer diameter of up to 900 µm.

13. A fiber optic assembly comprising:
a splice tray comprising:
a tray base having a rear surface and at least one edge surface surrounding at least a portion of a perimeter of the tray base, the tray base and the at least one edge surface defining a recess therein;
an inner latch extending from the edge surface and configured to engage a first fix point of a terminal base of a terminal;
an outer latch extending from the edge surface and disposed opposite to the inner latch; wherein the outer latch is configured to engage a second fix point disposed in the terminal base of the terminal; and
a handle within the tray base and coupled to the outer latch such that when the handle is actuated, the outer latch disengages from the second fix point and the splice tray is decoupled from the terminal base;
a terminal cover configured to engage a sidewall of the terminal to enclose a portion of the fiber optic assembly;
a midplane separating the terminal base and the terminal cover.

14. The fiber optic assembly of claim 13, further comprising a splice cover removably coupled to the edge surfaces of the tray base, wherein the splice cover is configured to at least partially enclose the recess.

15. The fiber optic assembly of claim 14, wherein when the splice cover covers the recess, the splice tray includes a storage area configured to route optical fibers circumferentially around the at least one splice holder.

16. The fiber optic assembly of claim 14, wherein the splice cover further comprises a parking area adjacent to the at least one splice holder.

17. The fiber optic assembly of claim 14, wherein the splice cover includes an aperture to enable a finger lever release to open the splice cover of the splice tray.

18. The fiber optic assembly of claim 13, wherein the handle is positioned on the rear surface of the tray base.

19. The fiber optic assembly of claim 13, wherein the splice tray can route optical fibers having an outer diameter of up to 900 μm.

* * * * *